United States Patent [19]

Pastor

[11] Patent Number: 4,992,670
[45] Date of Patent: Feb. 12, 1991

[54] IGNITION DISABLING ANTI-THEFT DEVICE

[76] Inventor: David E. Pastor, 3613 Hawaii Ct. S., Pleasanton, Calif. 94588

[21] Appl. No.: 332,575

[22] Filed: Apr. 3, 1989

[51] Int. Cl.$^5$ .............................................. B60R 25/04
[52] U.S. Cl. .................................... 307/10.3; 180/287
[58] Field of Search ........................ 307/10.3; 180/287; 340/64

[56] References Cited

U.S. PATENT DOCUMENTS

| | | | |
|---|---|---|---|
| 3,439,771 | 4/1969 | Commins | 180/114 |
| 3,614,458 | 10/1971 | Stein | 307/10 |
| 3,634,724 | 1/1972 | West | 315/209 |
| 3,656,102 | 4/1972 | Hale et al. | 340/64 |
| 4,004,273 | 11/1977 | Kalogerson | 340/64 |
| 4,110,734 | 8/1978 | Lepore et al. | 307/10.3 |
| 4,317,108 | 2/1982 | Schwartz | 340/64 |
| 4,452,197 | 6/1984 | Weber | 123/198 |
| 4,485,887 | 12/1984 | Morano | 307/10.3 X |
| 4,636,651 | 1/1987 | Kilgore | 307/10.3 |
| 4,739,736 | 4/1988 | Branco | 307/10.3 X |

*Primary Examiner*—William M. Shoop, Jr.
*Assistant Examiner*—Sharon D. Logan

[57] ABSTRACT

An ignition disabling anti-theft device (16) for a motor vehicle in which circuit switching devices (18 and 20) are used to disable the ignition system (6) of a vehicle every time the vehicle engine is shut off. The ignition sysem (6) can be enabled only by the application of battery voltage from a pre-existing vehicle electrical circuit through a secret switch (10). Further, the anti-theft device only disables the RUN circuit to the vehicle ignition system allowing the engine starter circuit to operate and the engine to start normally either with an unauthorized key or by splicing wires in the ignition circuit. When the starter circuit is deactivated after engine start, the engine will die, simulating an out of tune engine. A bypass switch (8) is provided to allow normal, unprotected operation of the engine ignition system when required.

2 Claims, 1 Drawing Sheet

FIG 1

IGNITION DISABLING ANTI-THEFT DEVICE

BACKGROUND—FIELD OF INVENTION

This invention relates to vehicle anti-theft devices, specifically to such devices that disable the vehicle ignition system.

BACKGROUND—DESCRIPTION OF PRIOR ART

Heretofore, many ignition disabling anti-theft devices have been offered, both passive (self-activating) or manually set systems (i.e. switch, key, etc.). A manually set anti-theft device has an immediate disadvantage. It requires a commitment to arm the device every time the vehicle is left vacant, and any visible means of activating a manual device (i.e. key) can be a target of the thieves attempting to steal the vehicle. The methods of disabling the ignition systems are varied.

The simple system will immediately disable the ignition upon being activated. U.S. Pat. Nos. 3,439,771 (Commins, 1969) and 3,656,102 (Hale and Housman,1972) are examples of passive complete ignition deactivation systems. The methods are different. U.S. Pat. No. 3,439,771 operates by grounding the ignition coil wiring. This method of operation, designed for an ignition "point" system, may cause damage to modern computer driven ignition systems. U.S. Pat. No. 3,656,102 simply disconnects the wiring, but uses a holding relay while the system is armed. This will introduce the problem of a run down battery during long term parking.

In these cases, the ignition system is completely disabled. Any attempt to start the engine results in unproductive cranking of the engine's starter. Since this is a rare occurrence in a modern vehicle, especially one that has been driven to a public parking lot, the thief will be alerted to the fact that that there is an anti-theft device in place.

A more complex type of ignition disabling anti-theft device will allow the vehicle to be moved before activating the ignition disabling device. U.S. Pat. Nos. 4,317,108 (Schwartz and Infante, 1982), 3,614,458 (Stein, 1971), and 4,004,273 (Kalogerson, 1977) are of this type. U.S. Pat. Nos. 4,317,108 and 3,614,458 use thermal delays to time the activation of the ignition disabling device. U.S. Pat. No. 4,004,273 shorts the ignition at a selected engine speed. In all of these devices, continued battery drain is required to maintain the deactivation of the ignition systems. In addition, with U.S. Pat. No. 4,004,273, the vehicle owner must decide what is the "best" engine speed to use for the trigger. These devices cause the vehicle to be disabled somewhere other than where the thief found it. The theory expounded is that the vehicle will be in a more visible location when disabled and that the thief will then abandon it rather than attempt to deactivate the anti-theft device. In reality, a very serious accident could occur when the vehicle is suddenly disabled on a public street.

A third type of ignition disabling anti-theft device is one that attempts to mislead the thief into believing that the vehicle is not driveable. U.S. Pat. Nos. 3,634,724 (West, 1972) and 4,452,197 Weber, 1984) are of this type. U.S. Pat. No. 3,634,724 keeps the spark voltage low so that misfiring and poor performance result. U.S. Pat. No. 4,452,197 allows the thief to drive for a brief period of time before the device intermittently disables the ignition system and finally stops the vehicle. These devices, like the previously described devices, allow the vehicle to be moved before being disabled with the same possibility for serious injury as those devices. Both of these devices place components in the ignition system to drain off ignition pulses and to cause inadequate spark voltage. It is unknown what damage could occur to modern computer driven ignition systems as they attempt to correct the problem based upon in place, multiple sensor inputs. In addition, a misfiring engine can cause the catalytic converters on vehicles so equipped to overheat.

A solution is needed for a passive ignition disabling device to protect a vehicle any time the vehicle is left vacant that will not alert the thief that there is such a device in place, and will not cause damage to the vehicle that it protects.

OBJECTS AND ADVANTAGES

Accordingly, several objects and advantages of my invention are:
 a. To provide an ignition disabling anti-theft device that activates itself automatically whenever the engine is stopped.
 b. To deny a thief the knowledge that an ignition disabling device is present.
 c. To provide an ignition disabling anti-theft device that will allow the engine to crank and start, but die as the ignition switch is returned to the RUN position.
 d. To allow stalled engine restarts without the confusion of having to reset the device.
 e. To keep the vehicle from moving under its own power.
 f. To provide a manual override switch to allow maintenance, valet parking, etc.
 g. To provide an ignition disabling anti-theft device that is safe for use with modern vehicle ignition systems.
 h. To provide an ignition disabling anti-theft device that does not drain battery current while protecting the vehicle.

Further objects and advantages of my invention will become apparent from a consideration of the drawings and ensuing description of it.

LIST OF REFERENCE NUMERALS

Figure 1:
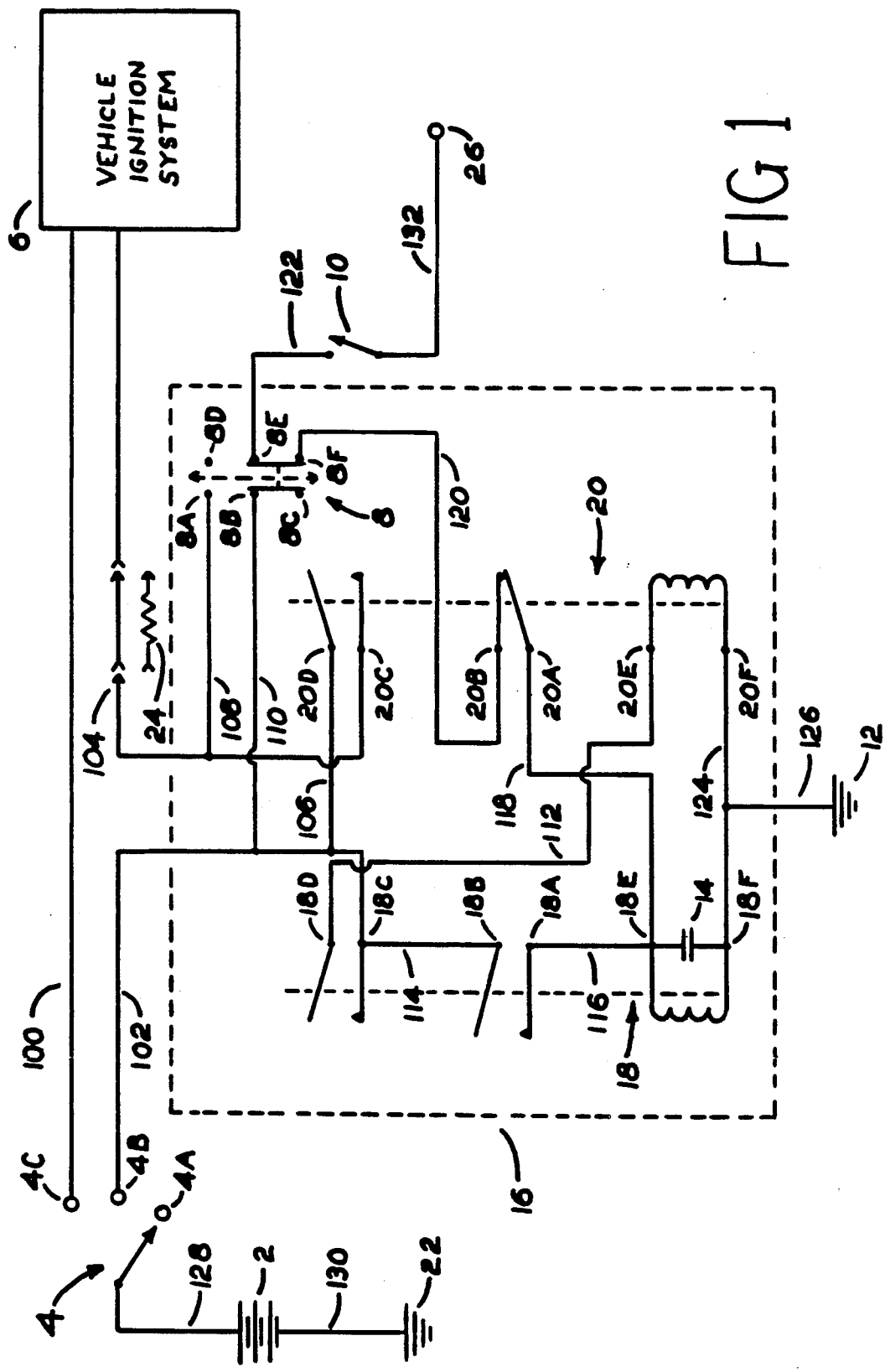
FIG. 1 is a schematic of the preferred embodiment of my invention and its interconnection to pre-existing motor vehicle circuits.

2 Battery
4 Ignition switch
 4A OFF position
 4B RUN position
 4C START position
6 Vehicle ignition system
8 Bypass switch
 8A–8F bypass switch terminals
10 Deactivating switch
12 Vehicle chassis ground
14 Capacitor
16 Ignition disabling anti-theft device
18 Circuit switching device
 18A–18F circuit switching device terminals
20 Circuit switching device 20A-20F circuit switching device terminals
22 Vehicle chassis ground
24 "Ballast" resistor
26 Positive voltage supply from pre-existing vehicle conductor
100-132 Conductors

DESCRIPTION OF THE INVENTION

FIG. 1 shows the preferred embodiment of my invention and its interconnection to pre-existing motor vehicle circuits. 16 designates the anti-theft device which may be installed in a vehicle with an internal combustion engine having spark ignition and having the usual components including a battery 2, a multiple contact ignition switch 4, an ignition system 6, and optionally, a "ballast" resistor 24 to reduce ignition system voltage and current during normal use.

The battery 2 is connected to the vehicle chassis ground 22 via conductor 130. Further, it is connected to the multiple contact ignition switch 4 with conductor 128. The terminals of the ignition switch 4A, 4B, and 4C are connected to various electrical circuits of the vehicle. Conductor 100 connects the ignition switch terminal 4C to the vehicle ignition system 6. Conductor 102 connects the ignition switch terminal 4B to the anti-theft device 16. The ignition switch terminal 4A is an open position.

The anti-theft device 16 consists of a multiple circuit switching device 18. This embodiment of which consists of an actuating coil and a plurality of coil and circuit switching terminals of which 18A, 18B, 18C, 18D, 18E, and 18F are connected to a plurality of conductors 102, 112, 114, 116, 118, and 124 arranged in a manner to allow the intended function of the circuit switching device. Capacitor 14 is connected to terminals 18E and 18F.

A second multiple circuit switching device 20, this embodiment of which consists of an actuating coil and a plurality of coil and circuit switching terminals. Terminals 20A, 20B, 20C, 20D, 20E, and 20F are connected to a plurality of conductors 104, 106, 112, 114, 120, and 124 arranged in a manner to allow the intended function of the circuit switching device. Conductor 126 connects conductor 124 to the vehicle chassis ground 12.

The bypass switch 8 is a manually operable switch of adequate electrical capacity that may be mounted on the anti-theft device or any other place in the vehicle that is not readily visible, and is shown in the normal operating position. In this position, deactivating switch 10 and conductor 122 are connected via terminals 8E and 8F to conductor 120. The deactivating switch 10 may be a hidden switch or a pre-existing vehicle switch that provides battery voltage when the ignition switch 4 is in the RUN position 4B. Conductor 132 connects the deactivating switch 10 with a positive battery voltage supply from a pre-existing vehicle conductor. Conductors 108 and 110 connect terminals 8A and 8B to conductors 104 and 106.

Conductor 104 connects the anti-theft device 16 to the vehicle ignition system. On many existing vehicles, a "ballast" resistor 24 is incorporated in series with conductor 104.

OPERATION OF THE INVENTION

The authorized vehicle operator will turn the ignition switch 4 to the RUN position 4B. At this time, the operator will apply a momentary voltage to the anti-theft device 16 with deactivating switch 10. This voltage will cause both circuit switching devices 18 and 20 to switch to the normal operating position. This position is held by a self latching provision in the circuitry. The operator is then free to switch the ignition switch to the START position 4C to start the engine. The vehicle ignition system will operate normally and the vehicle engine will operate normally.

An unauthorized operator will turn the ignition switch 4 to the RUN position 4B and then immediately to the START position 4C to start the engine. This can be done with either an unauthorized key in the ignition switch or, alternately, simulated by cutting and splicing the wires from the ignition switch. The result will be that the engine starter will function normally and, because of the pre-existing conductor 100 from the ignition switch, the engine will actually start. As soon as the ignition switch returns to the RUN position 4B, the engine will stop. Repeated efforts to start the engine will have the same effect. The perceived problem being an out of tune engine. After several unsuccessful attempts to start the engine, and afraid that continued efforts to start the engine will attract unwanted attention, the thief will abandon the vehicle.

A battery 2 is connected to a vehicle chassis ground 22 by conductor 130, and to an ignition switch 4 by conductor 128. Said switch 4 is a multiple contact switch typical of all modern vehicle ignition switches having at least three positions, OFF, RUN, and START. Said switch typically controls many circuits. The portion of said switch that is applicable to this invention is the portion that connects the battery 2 to the ignition system 6 of the vehicle. These terminals are shown as 4A, 4B, and 4C.

The ignition switch 4 OFF position 4A removes battery power from the vehicle ignition system 6 and allows engine shut down. Said switch 4 START position 4C directs battery power via conductor 100 to the vehicle ignition system 6 to allow the engine to start while said switch 4 is in the START position 4C only. Said switch 4 RUN position 4B directs battery power to the anti-theft device 16 via conductor 102, and is the normal engine running position of said switch. Conductor 102 directs the battery voltage to circuit switching device 18 terminal 18C and, via conductor 106 to circuit switching device 20 terminal 20D.

The functions of circuit switching device 18 are to provide voltage to actuate circuit switching device 20 and to maintain the self latching feature of the anti-theft device. The functions of circuit switching device 20 are to isolate the deactivating circuit from the anti-theft device therefore avoiding connection with deactivating switch 10 once the anti-theft device has been deactivated and to connect conductor 106 with conductor 104 to allow normal ignition system operation.

The circuit switching devices in this embodiment of the anti-theft device are coil actuated switching devices. In each circuit switching device two sets of switching contacts operate in unison when battery voltage is connected to one side of the actuating coil and the other side of the actuating coil is connected to a vehicle chassis ground. These contacts return to their unactuated state when voltage is removed. Both circuit switching device 18 and circuit switching device 20 actuating coils are connected to a vehicle chassis ground 12 from terminals 18F and 20F through conductors 124 and 126.

With the ignition switch in the RUN position 4B and the bypass switch 8 in the normal operating position, closing the deactivating switch 10 allows the positive voltage supply from the vehicle 26 to actuate circuit switching device 18 via conductors 132, 122, 120, and 118 and terminal 18E. Actuation of circuit switching device 18 closes the circuit between terminals 18A and 18B and closes the circuit between terminals 18C and 18D. This connects the battery voltage in conductor 102 to terminal 18E via conductors 114 and 116. The RUN circuit then maintains the actuation of circuit switching device 18. The battery voltage from conductor 102 is also applied to circuit switching device 20 terminal 20E via conductor 112 actuating circuit switching device 20. Capacitor 14 is connected between circuit switching device 18 terminals 18E and 18F to provide a short time delay circuit to assure steady contact in circuit switching device 18 during normal vehicle operation.

The actuation of circuit switching device 20 opens the circuit between terminals 20A and 20B and closes the circuit between terminals 20C and 20D. This action disconnects the positive voltage supply from the vehicle 26 from circuit switching device 18. This assures that the anti-theft device 16 can neither interfere with nor be interfered by other vehicle electrical circuits. Conductor 102 is also connected with conductor 104 through conductor 106 and terminals 20C and 20D allowing normal ignition system 6 operation.

The bypass switch 8, in the normal operating position, closes the circuit between terminals 8E and 8F. This allows the positive voltage supply from the vehicle 26, when the deactivating switch 10 is closed, to actuate circuit switching device 18 as described previously. When the bypass switch 8 is switched to the bypass position, the circuit between terminals 8E and 8F is opened isolating the deactivating switch from the anti-theft device 16. At the same time, the circuit between terminals 8A and 8B is closed. This action bypasses the anti-theft device by connecting conductor 106 with conductor 104 through conductors 108 and 110 and allows normal, unprotected operation of the vehicle.

CONCLUSIONS, RAMIFICATIONS AND SCOPE OF INVENTION

It has been shown that the invention of the ignition disabling anti-theft device is a simple, reliable, novel, and effective method of deterring vehicle thieves in that:

It activates itself automatically whenever the engine is stopped.

It denies a thief the knowledge that an ignition disabling device is present.

It allows an ignition disabling device that will allow the engine to crank and start, but die as the ignition switch is returned to the RUN position.

It allows stalled engine restarts without need to reset the device.

It does not allow the vehicle to be moved under its own power.

It contains a manual override switch to allow maintenance, valet parking, etc.

It is safe to sue with a modern vehicle ignition system.

It does not drain battery power while armed.

While the previous description of my invention contains many specifics, these shall not be construed a limitation on the scope of the invention but rather an exemplification of one preferred embodiment, thereof. Many other variations are possible. For example, the circuit may be made simpler or more complicated, or the circuit switching devices may be of a different type. In addition, while the anti-theft device is designed primarily for motor vehicles such as automobiles, boats, and aircraft, this device may be used to prevent unauthorized operation of stationary engines such as pumps, electric generators, etc., or any other use of an ignition engine.

Accordingly, the scope of the invention should be determined not by the embodiment illustrated, but by the appended claims and their legal equivalents.

I claim:

1. In an engine vehicle having a battery with a pair of terminals, one of said terminals being grounded and the other providing a source of operating current for electrical circuits of the engine powered vehicle, an ignition system, an ignition switch having a run position, a start position and an off position for selectively switching battery current off or on to the ignition system in either the start or the run positions, an anti-theft device comprising:

an electrically operable circuit switching means including a first set of normally open switch contacts connected between an ignition switch run terminal and said ignition system to prevent passage of battery current from said ignition switch run terminal to said ignition system thereby preventing operation of said ignition system when said ignition switch is in the run position, and a second set of normally open switch contacts connected between said first set of normally open switch contacts and said ignition switch run terminal such that one said ignition switch is in the run position and battery current is applied to said electrically operable circuit switching means and said first set of normally open switch contacts close and in response to said first set of normally open switch contacts closing, said second set of normally open switch contacts close and perform as a latching means to maintain the battery current applied to said electrically operable circuit switching means;

a third set of manually operable switch with a normally open contacts connected between said electrically operable circuit switching means and said battery such that upon closing said third set of normally open contacts, battery current is allowed to pass to actuate said electrically operable circuit switching means to close said first set of normally open switch contacts and allow normal passage of battery current from said ignition switch run terminal to said ignition system, and activate said latching means to maintain passage of battery current from said ignition switch run terminal to said ignition system until said ignition switch is turned to the off position.

2. The anti-theft device as in claim 1 wherein said electrically operable circuit switching means includes a fourth set of normally closed switch contacts connected between said manually operable switch and said second set of normally open switch contacts such that upon application of battery current to and actuation of said electrically operable circuit switching means, said fourth set of normally closed switch contacts opens and disconnects and isolates said electrically operable circuit switching means from said manually operable switch such that inadvertent application of battery current to said circuit switching means from said manually operable switch cannot occur during the time that battery current is allowed to pass from said ignition switch run terminal to said ignition system, thereby avoiding possible interference with said vehicle ignition system.

* * * * *